(12) United States Patent
Manduley et al.

(10) Patent No.: US 6,768,790 B1
(45) Date of Patent: Jul. 27, 2004

(54) MESSAGE AUTOMATED INFORMATION SYSTEM AND IMPORTANCE NAVIGATOR

(75) Inventors: Flavio M. Manduley, Woodbury, CT (US); Matthew S. Lukaszewski, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/350,724

(22) Filed: Jul. 9, 1999

(51) Int. Cl.[7] .......................................... H04M 11/00
(52) U.S. Cl. ............................. 379/88.13; 379/88.25; 379/88.19; 709/203; 709/207
(58) Field of Search ............................ 379/67.1, 142.15, 379/88.13, 88.14, 88.18, 88.25, 68, 88.22, 88.17, 88.19; 709/203, 207

(56) References Cited

U.S. PATENT DOCUMENTS

| | | | | |
|---|---|---|---|---|
| 4,652,700 A | * | 3/1987 | Matthews et al. ............ | 379/89 |
| 5,396,229 A | * | 3/1995 | Miyauchi ................... | 340/7.55 |
| 5,524,137 A | * | 6/1996 | Rhee ....................... | 379/100.08 |
| 5,555,346 A | * | 9/1996 | Gross et al. ................ | 706/45 |
| 5,586,173 A | | 12/1996 | Misholi ..................... | 379/89 |
| 5,668,855 A | | 9/1997 | Misholi ..................... | 379/89 |
| 5,668,998 A | | 9/1997 | Mason ...................... | 395/701 |
| 5,671,269 A | | 9/1997 | Egan et al. ................. | 379/88 |
| 5,701,484 A | | 12/1997 | Artsy ....................... | 395/683 |
| 5,796,394 A | * | 8/1998 | Wicks et al. ................ | 345/751 |
| 5,859,898 A | * | 1/1999 | Checco .................... | 379/88.01 |
| 6,173,042 B1 | * | 1/2001 | Wu ......................... | 347/23 |
| 6,351,764 B1 | * | 2/2002 | Voticky et al. ............. | 709/207 |
| 6,411,685 B1 | * | 6/2002 | O'Neal ..................... | 379/88.14 |

OTHER PUBLICATIONS

Running Microsoft Outlook 98, by Alan Neibauer, published by Microsoft Press, 1998.*

* cited by examiner

Primary Examiner—Fan Tsang
Assistant Examiner—Simon P Sing
(74) Attorney, Agent, or Firm—Ronald Reichman; Angelo N. Chaclas

(57) ABSTRACT

This invention is a system and method that provides for the total integration and processing of all possible incoming message types into a single unit at one location. This invention also provides a system to automatically route messages based upon the preferences of the party who received the message. Responses to messages may be kept with the original message so that the status of the message may be maintained. This invention also presents an integrated approach for transmitting messages in all possible media from a single device at one location.

21 Claims, 8 Drawing Sheets

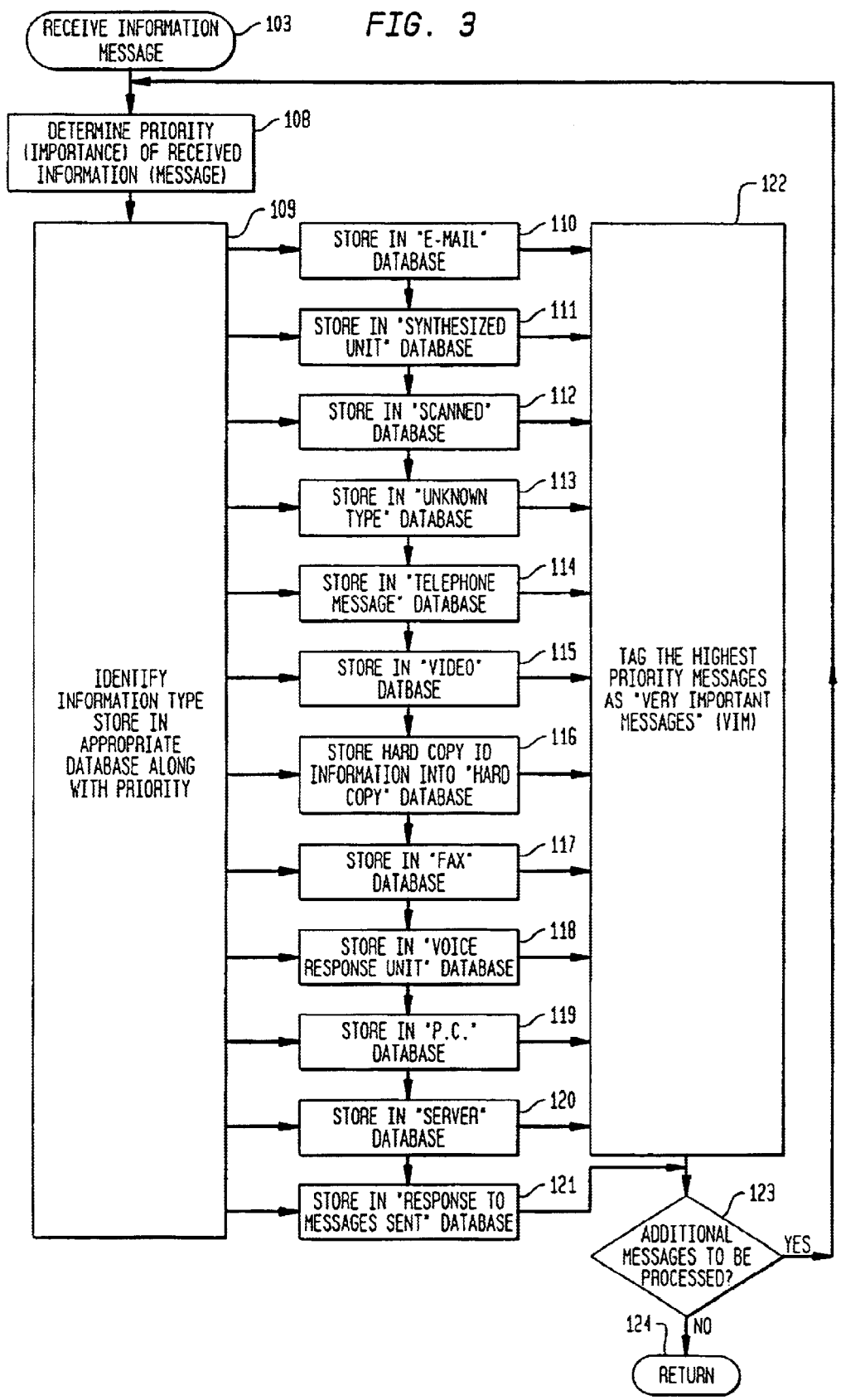

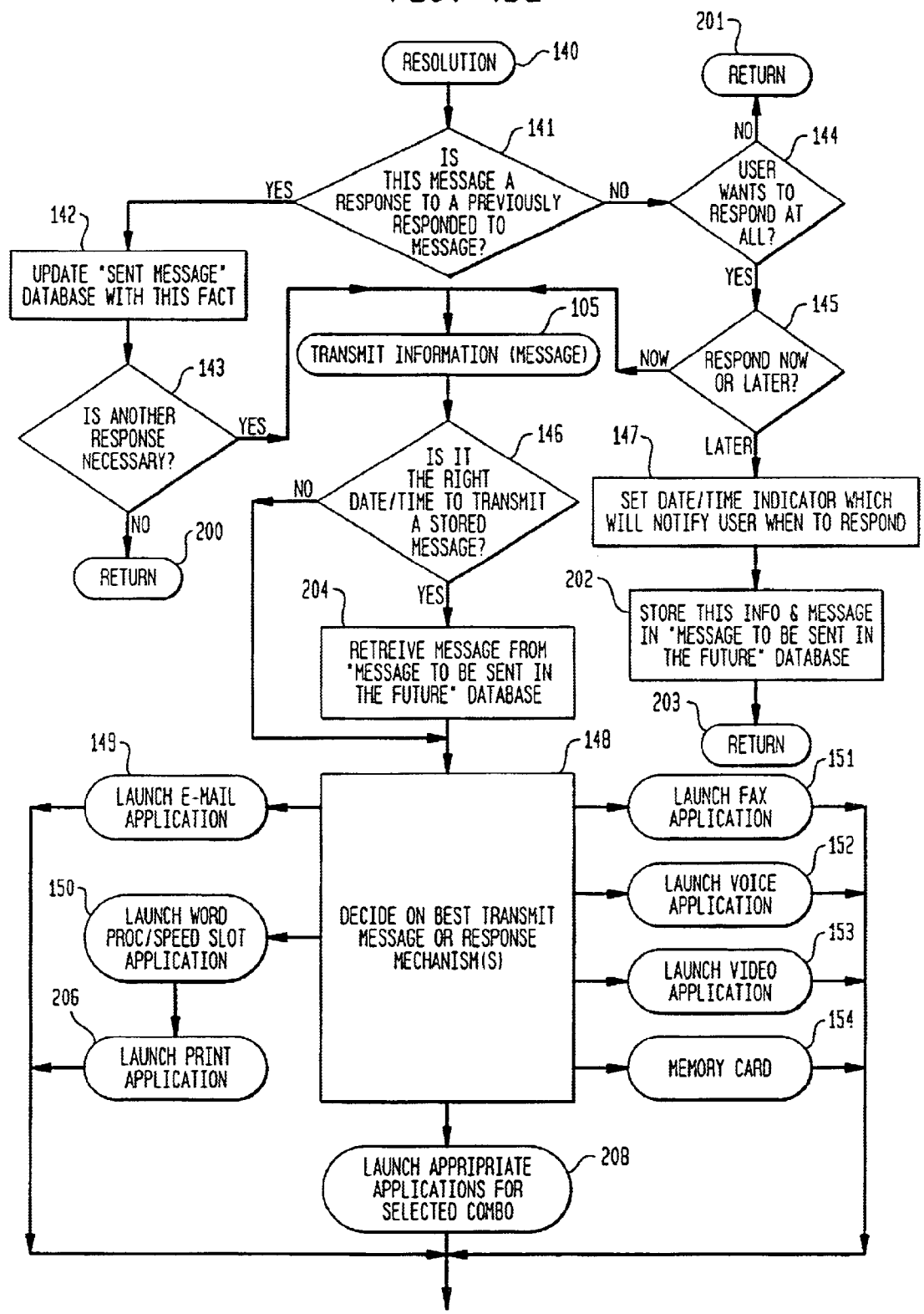
FIG. 4B1

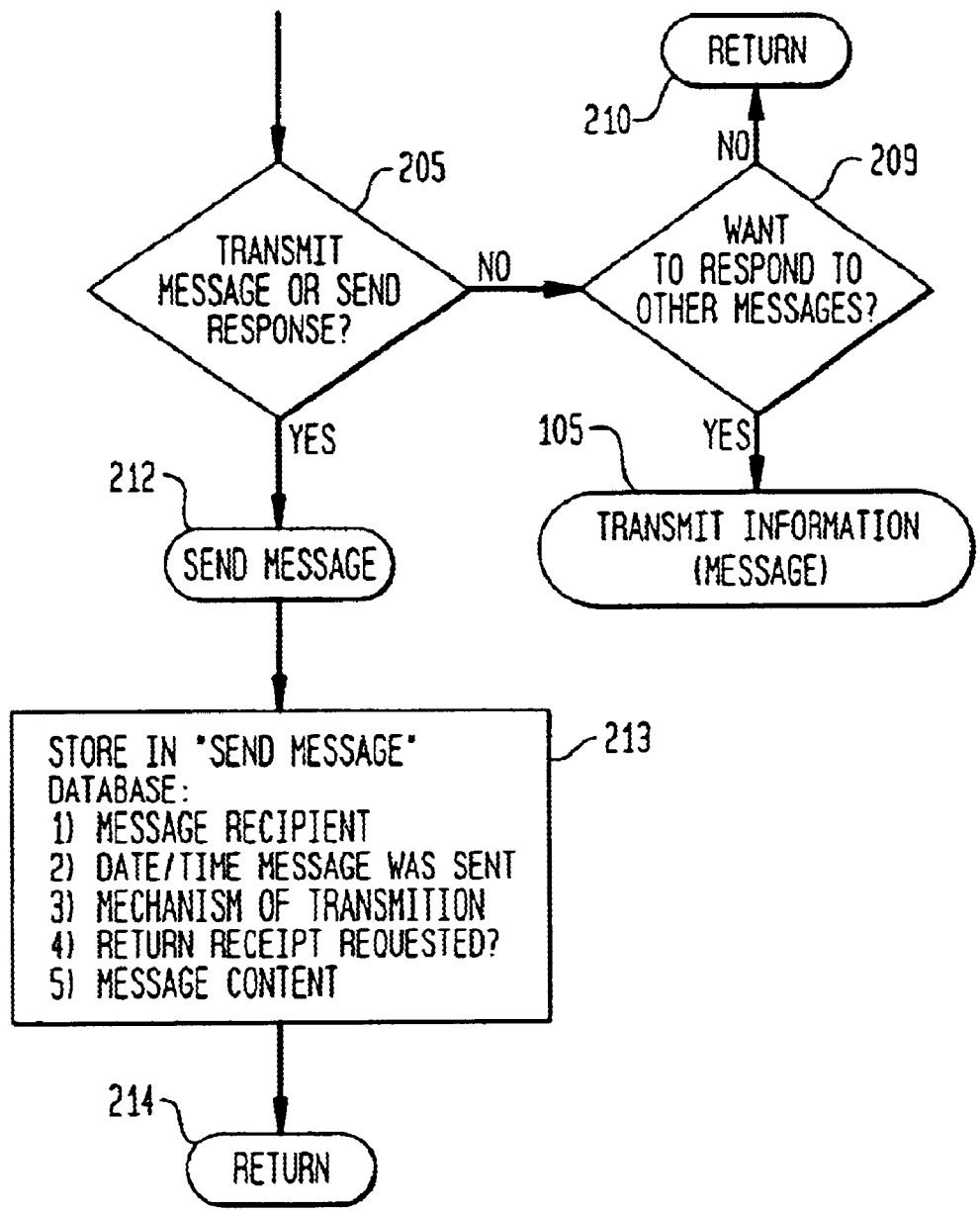
FIG. 4B2

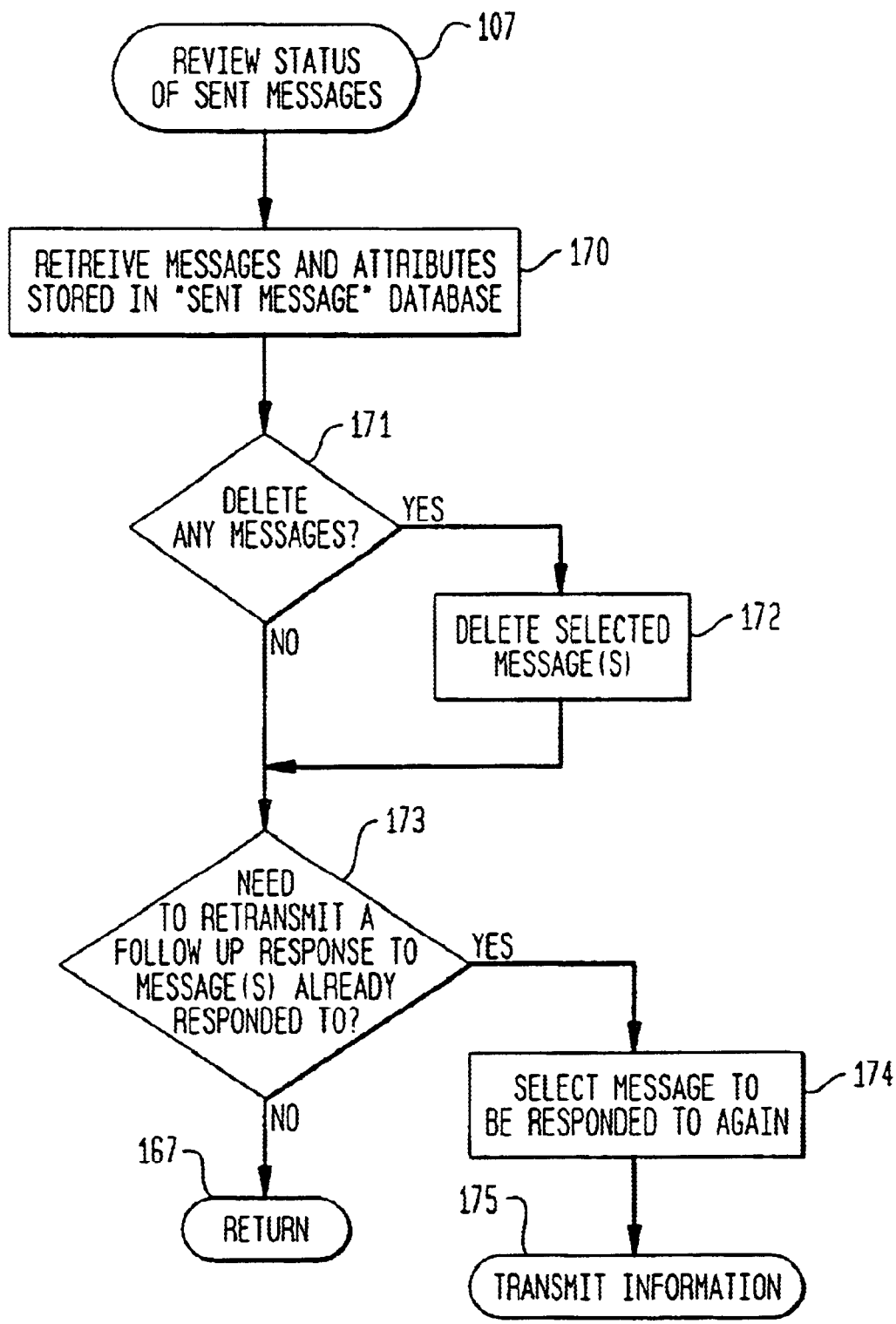

MESSAGE AUTOMATED INFORMATION SYSTEM AND IMPORTANCE NAVIGATOR

FIELD OF THE INVENTION

This invention relates generally to the field of information management and more particularly to the field of managing incoming information received from a plurality of media and determining the optimal transmission media for the generation of new messages or responses to the received information.

BACKGROUND OF THE INVENTION

From the dawn of civilization, people have directly transmitted information from one person to another. Information was first transmitted by speech and later by the written word. Writings enabled people to transmit information by messengers from a location in which the sender of the writing was present to another location where the receiver was present. In time, postal services were developed in which a person would deliver a letter to the post office in one city and an agent of the post office would deliver that letter to a post office in another city where the letter would be picked up by the person to whom the letter was sent. Ever since the numeric codification of streets and buildings received general acceptance, an individual's name and their household postal address have been linked.

With the advent of general local and then national telephone service, a second numbering system was developed based on the location of the telephone that was assigned to a particular individual. This second number was tied by tradition to the individual's numeric household address.

Cellular telephone services have been developed in which the cellular telephone can be moved from one location to another. The cellular telephone is assigned a numeric identification number. When the cellular telephone is in the roaming mode, i.e., being moved from one location to another, the cellular telephone network needs a little help from the user of the cellular telephone to establish the location of the cellular telephone.

Facsimile machines that utilize the telephone network have been developed to transmit information from one facsimile machine to another. Computers that utilize modems and the telephone network have been developed to transmit information from one computer to another. Currently, information may also be transmitted from one location to another by a smart telephone, i.e., a telephone having a screen and a keyboard and information may also be transmitted by cable television i.e., invoices.

Currently, individuals are receiving information by mail, telephone, cellular telephone, telephone answering machines, facsimile machine, computer, and cable television. A disadvantage of the prior art is that all of the information has to be handled in a different manner using different devices. For instance, when one goes to work in the morning, an individual has to: check voice mail to retrieve the phone messages; check a computer to determine the E-mail messages; go to a facsimile machine to review the facsimile messages; go to their inbox to review letter mail; and go to a television set to review information transmitted by video.

An additional disadvantage of the prior art is that the individual may review the messages in an order that bears no relationship to their perceived importance.

Another disadvantage of the prior art is that the individual may have to check all of the media before they obtain the message that is most important to them.

Another problem encountered by the prior art is that, often times, the sender of a message has to review the status of a sent message, i.e., did the recipient of the message actually perform the task requested by the sender of the message. Often, the sender has to contact the recipient of the message to determine whether or not the task has been completed.

SUMMARY OF THE INVENTION

This invention overcomes the disadvantages of the prior art by providing a system and method that enables incoming information (messages) received from a plurality of devices to be available on a single unit so that the information may be accessed at one location using the single unit. This invention also provides a system to automatically route messages based upon the preferences of the party who received the message. Responses to messages may be kept with the original message so that the status of the message may be maintained.

This invention also enables one to send a message in the most optimal manner.

BRIEF DESCRIPTION OF THE DRAWINGS

FIG. 3 is a flow chart showing the routine for processing information from incoming messages;

FIGS. 4A and 4B is a flow chart showing the routine for processing messages and transmitting messages;

FIG. 5 is a flow chart showing the status of the messages that were sent by this invention.

DETAILED DESCRIPTION OF THE PREFERRED EMBODIMENT

Figure 1:
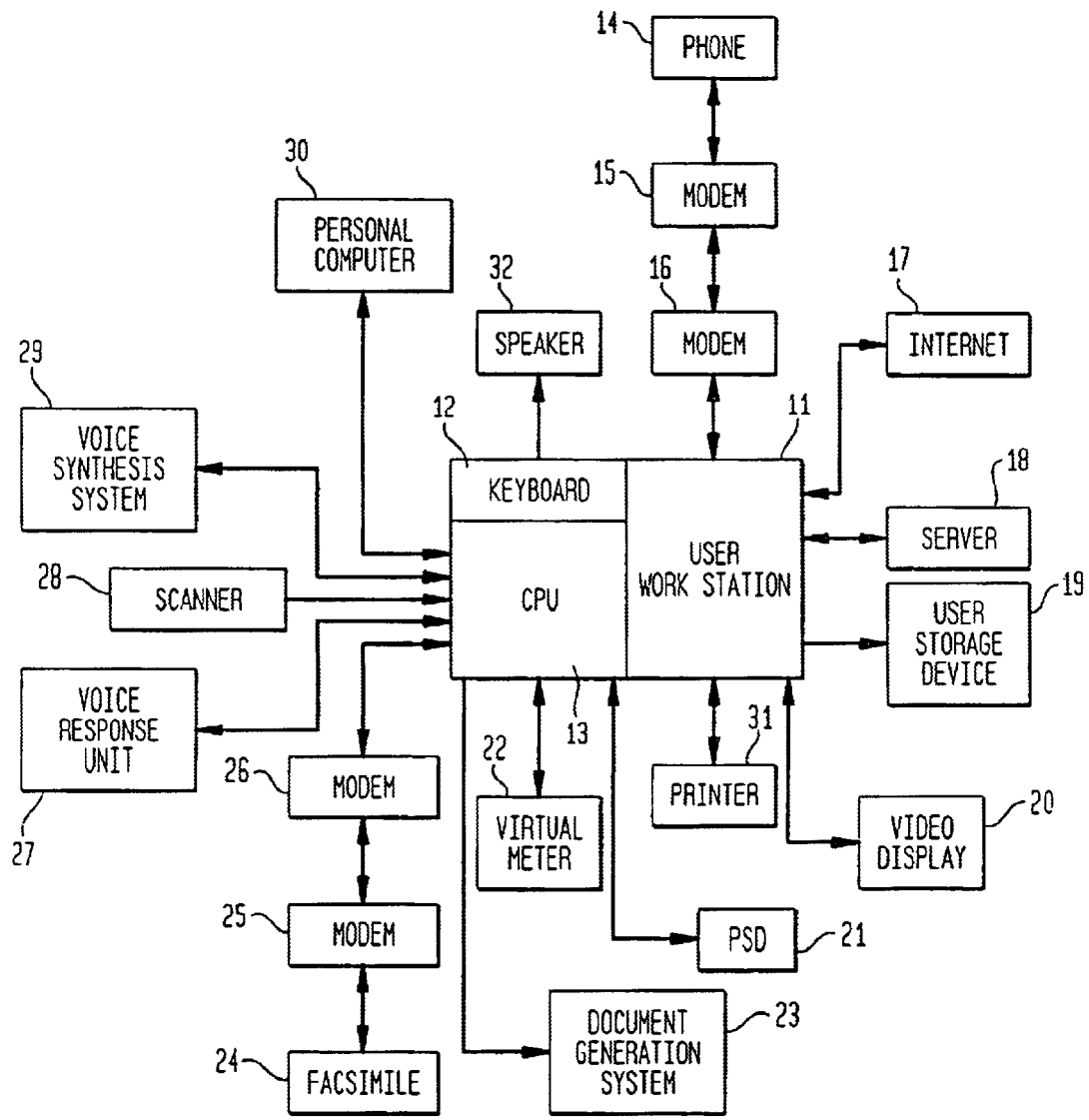
FIG. 1 is a block diagram of the system of this invention.

Referring now to the drawings in detail, and more particularly to FIG. 1, the reference character 11 represents a user's work station. Unit or work station 11 includes a keyboard 12 and a central processing unit (CPU) 13. Telephone 14 is coupled to modem 15, and modem 15 is coupled to modem 16. Modem 16 is coupled to work station 11. Voice data is transmitted to and from telephone 14 to work station 11 via modems 15 and 16. A cellular telephone may also be used to communicate with station 11. Work station 11 is coupled to the internet 17 so that E-mail messages, data, voice and audio information may be sent to and from station 11. A server 18 is coupled to station 11 so that server 18 may hold and store information waiting to be sent to station 11. Server 18 may also be used as a conduit to other work stations (not shown) on a local area network. A user storage device 19, i.e., disk drive, CD drive, etc. is connected to station 11 so that device 19 may store information. A video display 20 is coupled to station 11 so that information may be displayed on display 20.

Postal Security Device (PSD) 21 is coupled to central processing unit 13. PSD 21 is a secure device which stores postal funds and performs accounting on disbursed funds. Virtual meter 22 is coupled to central processing unit 13. Virtual meter 22 provides an alternative mechanism for accessing, disbursing and accounting of postal funds by coupling to internet 17 via CPU 13 for internet access. Printer 31 is also coupled to central processing unit 13. PSD 21 and meter 22 are used to affix postage to mail. Document generation station 23 is coupled to central processing unit 13. Document generation station 23 is used to produce personalized mail pieces that may contain different inserts that are inserted into mail pieces and sealed by generation station 23. Station 23 may be the DocuMatch™ system manufactured by Pitney Bowes Inc. of 1 Elmcroft Road, Stamford, Conn. Facsimile 24 is coupled to modem 25, and modem 25 is coupled to modem 26. Modem 26 is coupled to central processing unit 13. Graphic and text information are transmitted to and from facsimile 24 to CPU 13 via modems 25 and 26. Voice response unit 27 is coupled to CPU 13. Voice response unit 27 generates an acoustic speech signal that communicates an intended message to a human request for information. The human may enter information into unit 27 by pressing various keys on a telephone when prompted by unit 27. The keyed information is then entered into CPU 13. A scanner 28 is coupled to CPU 13. Scanner 28 may scan information that is subsequently digitized and sent to CPU 13. Copies of scanned information may be produced using printer 31. A voice synthesis system 29 is coupled to CPU 13. System 29 converts voice data into a format that CPU 13 converts to alphanumeric text. System 29 may also be used to instruct CPU 13 to perform various functions. Personal computer 30 is coupled to CPU 13. Information and data may be transmitted to and from computer 30 and CPU 13. The information may also be processed by one or both of the aforementioned computers. Speaker 32 is coupled to CPU 13. Speaker 32 permits one to hear the voice messages sent by the devices capable of producing audio messages, i.e., telephone 14, internet 17, server 18, unit 27, system 29, etc.

Figure 2:
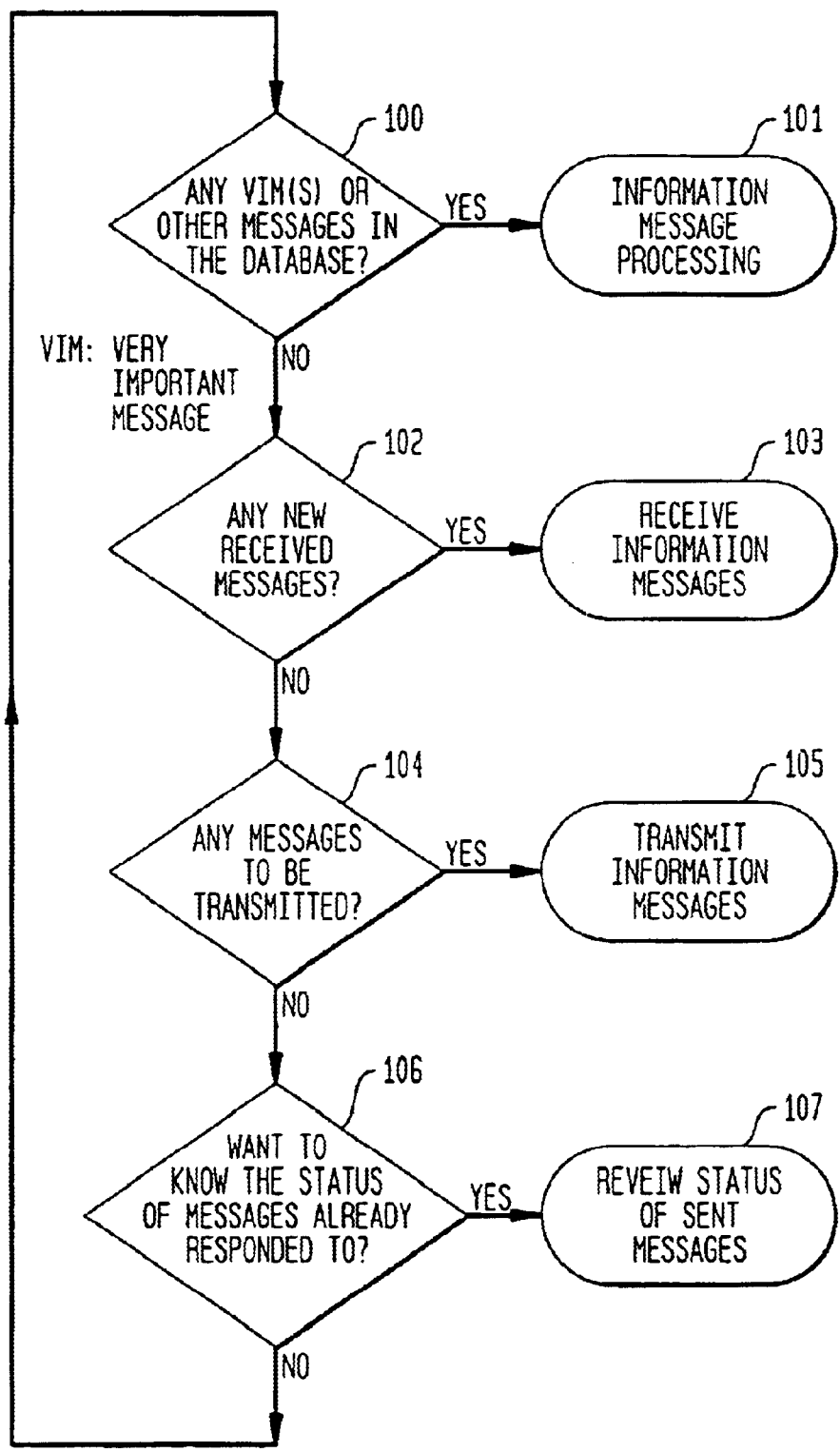
FIG. 2 is a drawing of a flow chart showing the executive routine of this invention.

FIG. 2 is a drawing of a flow chart showing the executive routine of this invention. This program begins in decision block 100. Block 100 determines whether or not there are any very important messages that were previously received and were not processed and were stored in the received message data bases, i.e., data bases 110–121 (FIG. 3). If decision block 100 determines that there are very important messages or other messages in the data base, the program will proceed to block 101. Block 101 will process the information contained in the message. If block 100 determines that there are no very important messages or other messages in the data base, the program will proceed to decision block 102. Block 102 will determine whether or not there are any new received messages. If decision block 102 determines that there are new received messages, the program will proceed to block 103. Block 103 will receive the new message(s). If block 102 determines that there are no new messages, the program will proceed to decision block 104. Block 104 determines whether or not there are any messages to be transmitted. If decision block 104 determines that there are messages to be transmitted, the program will proceed to block 105. Block 105 will transmit the message(s). If block 104 determines that there are no messages to be transmitted, the program will proceed to decision block 106. Block 106 determines whether or not one wants to know the status of the message(s) all ready responded to. If decision block 106 determines that the status of the messages is wanted, the program will proceed to block 107. Block 107 will review the status of the sent messages. If block 106 determines that the status of the messages is not wanted, the program will proceed back to the input of decision block 100.

Figure 6:
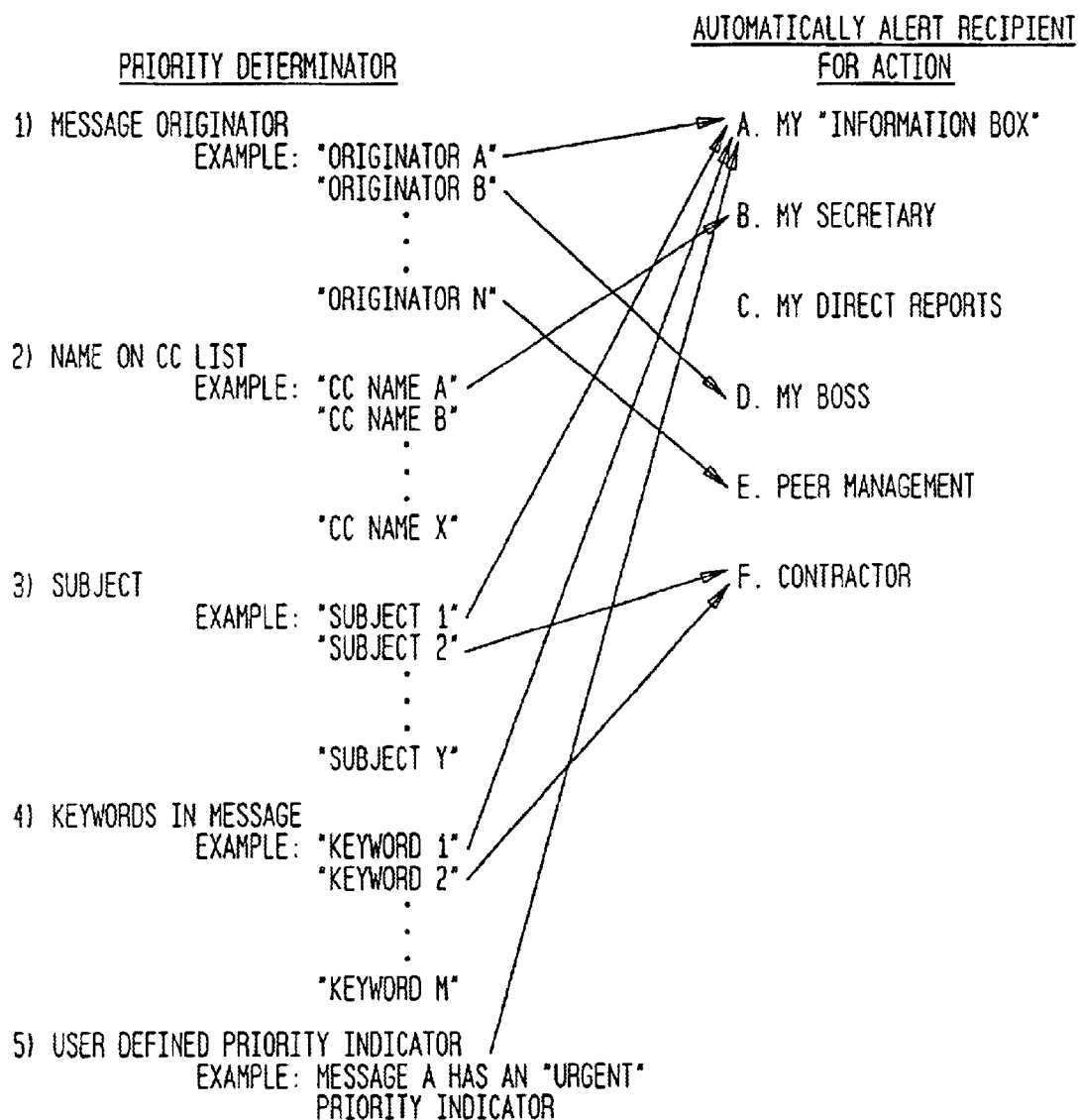
FIG. 6 is an illustration of a priority table that determines the destination of the messages based upon user defined priorities.

FIG. 3 is a flow chart showing the routine for processing new incoming messages. The program receives messages in block 103 and then goes to block 108. Block 108 determines the priority of the received message. The priority of the received message is determined by a priority indicator embedded in the received message if the indicator exists. If the priority indicator is set, it overrides other factors like the subject or originator of the message. FIG. 6 depicts the automatic routing of received messages as a function of routing rules or factors. Then the program goes to block 109.

Block 109 identifies the message type and stores the message in the appropriate data base along with its priority. If block 109 determines that the message was transmitted by E-mail, the message will be stored in block 110 E-mail data base along with its priority. If block 109 determines that the message was transmitted by synthesized voice, the message will be stored in block 111 synthesized voice data base, along with its priority. If block 109 determines that the message was scanned, the message will be stored in block 112 scanned data base, along with its priority. If block 109 determines that the message was transmitted with some unknown message type, the message will be stored in block 113 unknown type data base, along with its priority. If block 109 determines that the message was transmitted by telephone, the message will be stored in block 114 telephone message data base, along with its priority. If block 109 determines that the message was transmitted by video, the message will be stored in block 115 video data base, along with its priority. If block 109 determines that the message was originally transmitted in a hard copy (paper) format and copies were made by the system to be eventually sent in a hard copy (paper) form, the scanned image of the hard copy message will be stored in block 116 hardcopy data base, along with its priority If block 109 determines that the message was transmitted by facsimile, the message will be stored in block 117 facsimile data base, along with its priority. If block 109 determines that the message was transmitted by a voice response unit, the message will be stored in block 118 voice response unit data base, along with its priority. If block 109 determines that the message was transmitted by a personal computer, the message will be stored in block 119 personal computer data base, along with its priority. If block 109 determines that the message was transmitted by the server, the message will be stored in block 120 server data base, along with its priority.

The data bases of blocks 110–120 are object-oriented data bases. An attribute "priority" exists for each object (message). The attribute is set by the contents of the "priority Indicator" which was determined in block 108. Data bases 110–120 are logical data bases. The physical data base is normally the one associated with the type of message, i.e., Lotus Notes for E-mail block 110.

If block 109 determines that the message is a response to the message previously stored in data bases 110–120, the message will be stored in block 121 response to message sent database. Block 109 will tag the highest priority message(s) as "a very important message(s)". All the messages from blocks 110–120 with their priority will be stored in block 122. Block 122 will also tag the other messages in priority order. Then the program will go to decision block 123. Decision block 123 will determine whether or not additional messages are to be processed. If block 123 determines that there are additional messages to be processed, the program will go back to the input of block 108. If block 123 determines that there are no additional messages to be processed, the program will go to block 124 to return to the executive routine to determine if there are any messages to be transmitted in block 104 (FIG. 2).

Figure 4A:
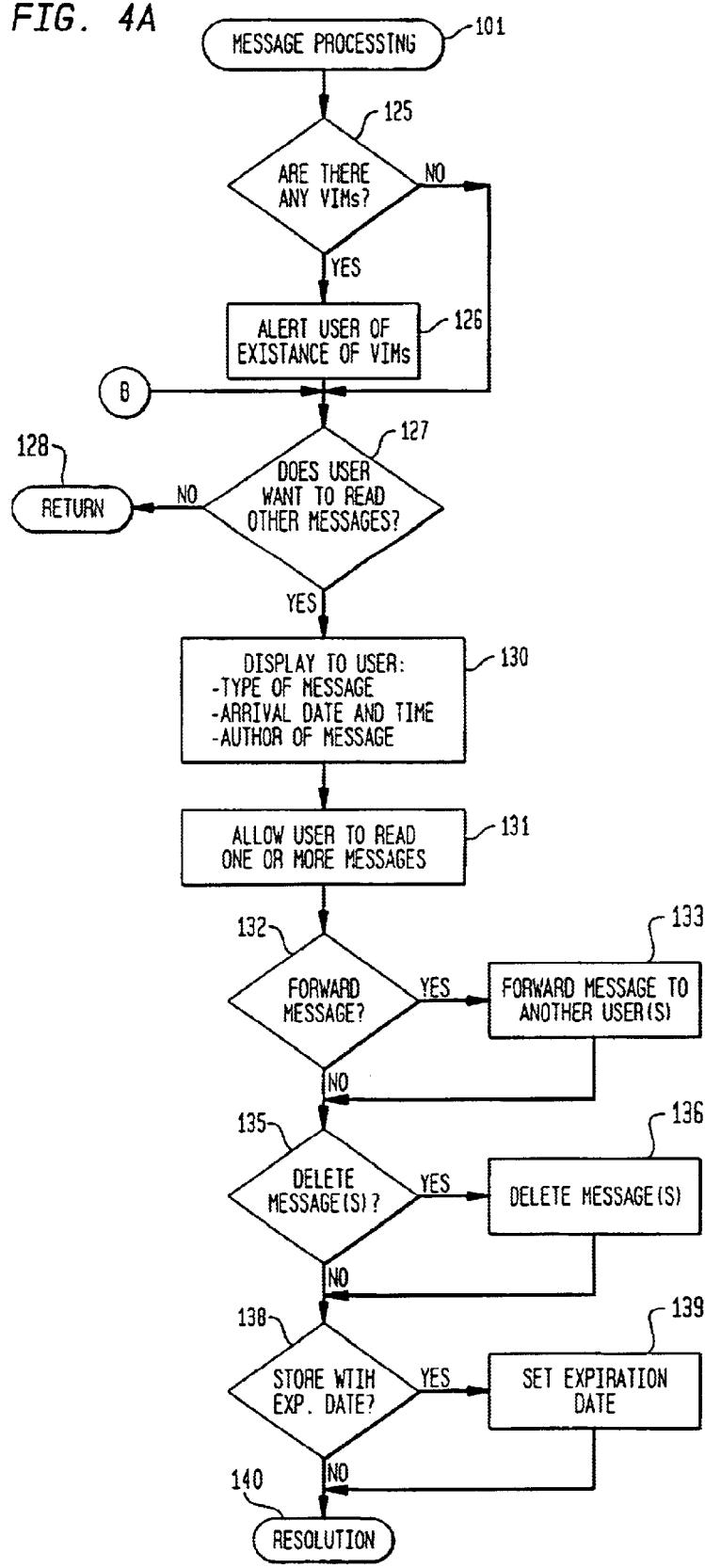

FIGS. 4A and 4B are a flow chart showing the routine for processing received messages and transmitting messages. The program begins in block 101 (FIG. 4A) message processing. Then the program goes to decision block 125. Decision block 125 determines whether or not there are any very important messages to be processed. If block 125 determines that there are one or more very important messages, the program goes to block 126 to inform the user of the existence of the very important messages. Then the program goes to block 130. If block 125 determines that there are no very important messages to be processed, the program goes to decision block 127. Decision block 127 determines whether or not the user wants to read, view or listen to other stored messages. If block 127 determines that the user does not want to read other messages, the program goes to block 128 to return to the executive routine to determine if there are any new received messages in block 102 (FIG. 2). If block 127 determines that the user wants to read, view, or listen to other stored messages, the program goes to block 130. Block 130 displays to the user: the type of message; the date and time of arrival of the message; and the author of the message. Block 130 will list the very important messages as the highest priority messages to be read, viewed, listened to, and resolved. Now the program goes to block 131 to allow the user to read, view, or listen to one or more messages. Block 131 will link the message to the appropriate application for reading the message or launching the application. Now the program goes to decision block 132. Decision block 132 determines whether or not to forward the message(s). If block 132 determines to forward the message(s), the program goes to block 133 to forward the message to another user(s). The routing rules of FIG. 6 will be used to forward the message(s). Then the program goes to block 135. If block 132 determines not to forward the message, the program goes to decision block 135.

Decision block 135 determines whether or not to delete the message(s). If block 132 determines to delete the message(s), the program goes to block 136 to delete the message(s). Then the program goes to block 138. If block 135 determines not to delete the message(s), the program goes to decision block 138. Decision block 138 determines whether or not to store the message(s) with an expiration date. If block 138 determines to store the message(s) with an expiration date, the program goes to block 139 to store the message(s) with an expiration date. Then the program goes to block 140. If block 138 determines not to set an expiration date, the program goes to block 140 resolution.

Block 140 (FIG. 4B) continues to process the received messages. Then the program goes to decision block 141. Decision block 141 determines whether or not the message is a response to a previously responded to message. If block 141 determines the message is a response to a previously responded to message, the program goes to block 142 to update the sent message data base with this fact. Then the program goes to decision block 143. If block 143 determines that another response to the message is not necessary, the program goes to return block 200. Then the program returns to the executive routine to determine if there are any new received messages in block 102 (FIG. 2). If block 143 determines that another response to the message is necessary, the program goes to transmit information (message) block 105. If block 141 determines the message is not a response to a previously responded to message, the program goes to decision block 144. Decision block 144 determines whether or not the user wants to respond at all. If block 144 determines that the user does not want to respond, the program goes to block 201 to return to the executive routine to determine if there are any new received messages in block 102 (FIG. 2). If block 144 determines that the user wants to respond, the program goes to decision block 145. Block 145 determines whether or not the user wants to respond now or later. If block 145 determines that the user wants to respond now, the program goes to transmit information (message) block 105. If block 145 decides to respond later, the program will go to block 147 to set the date/time indicator which will notify the user when to respond. Then the program will go to block 202 to store the information (message) in "Message to be sent in the future data base". Now the program will go to return block 203, which returns to the execution routine to determine if there are any new received messages in block 102 (FIG. 2).

Decision block 146 will receive an input from transmit information (message) block 105. Block 105 is also entered from executive routine block 104 if there is a need to send a message(s). Block 146 will determine if it is the right date/time to transmit a message that was stored. If block 146 determines that it is the proper date/time to send the message, the program will go to block 204 to obtain the message from the message to be sent in the future data base. If block 146 determines that the message is not the proper date/time to send a message, the program will go to block 148.

Block 148 will decide the best media to transmit a new message or respond to a received message. The choice of media, i.e., delivery mechanism, determined by block 148 will be dependent upon: the performance of the media; compatibility to the recipient's media; the cost of delivering the message; and other user determined criteria. If block 148 decides that E-mail is the best media to transmit a new message or respond to a received message, the program will go to block 149 to launch the E-mail application. Then the program will go to the input of decision block 205. If block 148 decides that the use of a document generation system (for hard copy output) is the best media to transmit a new message or respond to a received message, the program will go to block 150 to launch the word processing application. Now the program will go to block 206 to launch the print application, which may be the DocuMatch™ system. Then the program will go to the input of decision block 205. If block 148 decides that facsimile is the best media to transmit a new message or respond to a received message, the program will go to block 151 to launch the facsimile application. Then the program will go to the input of decision block 205. If block 148 decides that voice is the best media to transmit a new message or respond to a received message, the program will go to block 152 to launch the appropriate voice application. The appropriate voice application may be telephone, the internet, a voice response unit, real voice, synthesized voice, or any combination of the above. Then the program will go to the input of decision block 205. If block 148 decides that video is the best media to transmit a new message or respond to a received message, the program will go to block 153 to launch the video application. The video application may transmit canned video responses or real tine video responses. Then the program will go to the input of decision block 205. If block 148 decides that a memory card is the best media to transmit a new message or respond to a received message, the program will go to block 154 to launch the memory card application. Then the program will go to the input of decision block 205. If block 148 decides that a combination of all or some of the above mechanisms are desired to transmit a new message or respond to a received message, the program will go to block 208 to launch the applications for the selected combination (all combinations are possible).

Then the program will go to decision block 205. Decision block 205 will determine whether or not to transmit a new message or send a response to a received message. If block 205 decides not to transmit or respond to the message the program will go to decision block 209. Decision block 209 will determine whether or not to respond to other received messages. If block 209 decides not to respond to other received messages, the program will go to block 210 to return to the executive routine to determine the status of the already responded to messages in block 106 (FIG. 2). If block 209 decides to respond to other received messages, the program will go to block 105 transmit information. If block 205 decides to transmit or respond to the message, the program will go to block 212 to send the message. Then the program will go to block 213. Block 213 will store in the sent message data base: the message recipient; the date and time the message was sent; the mechanism of transmitting the message; whether or not a return receipt was requested; and the message content. At this point the program will go to block 214 to return to the executive routine to determine the status of the already responded to messages in block 106 (FIG. 2).

Now the program goes to block 107 (FIG. 5) to review the status of the sent message(s). Then the program goes to block 170 to retrieve the messages and attributes stored in the sent message data base. The messages in the sent message data base will be stored first according to their very important message status and then by their type. Now the program will go to decision block 171. Decision block 171 will determine whether or not to delete any messages. If block 171 decides to delete any messages, the program will go to delete the selected message(s). If block 171 decides not to delete any messages or block 172 has deleted one or more messages, the program will go to decision block 173. Decision block 173 will determine whether or not to retransmit a follow up response to message(s) already responded to. If block 173 decides to retransmit a follow up response to message(s) already responded to, the program will go to block 174 to select the message(s) that is/are going to be responded to again. Then the program goes to block 105 to transmit the message(s). If block 173 decides not to retransmit a follow up response to message(s) already responded to, the program will go to block 167 to return to the executive routine to determine whether or not there are any very important messages in block 100 (FIG. 2).

FIG. 6 is an illustration of a priority table that depicts the automatic routing of received messages as a function of routing rules.

The above specification describes a new and improved integrated system and method for receiving, transmitting, and routing messages. It is realized that the above description may indicate to those skilled in the art additional ways in which the principles of this invention may be used without departing from the spirit. It is, therefore, intended that this invention be limited only by the scope of the appended claims.

What is claimed is:

1. A system that enables incoming information received from a plurality of messaging devices to be available on a single unit so that the information may be accessed by a user at one location using the single unit, said system comprising:
   means for obtaining information from the plurality of devices;
   means for identifying the information by message media type;
   means for sending the information and message type media to the single unit;
   means for ordering the obtained information from the plurality of devices from most important to least important by utilizing user defined importance criteria stored in the single unit and/or a sender enabled priority indicator embedded in the information;
   means coupled to the ordering means for indicating the message media type of the received message;
   means coupled to the ordering means for responding to the obtained information in a optimal fashion;
   means for automatically routing the ordered information in accordance with user selections routing rules; and
   means coupled to the ordering and responding means for determining the status of responded to information and obtained information.

2. The system claimed in claim 1, further including:
   means coupled to the responding means for preparing a message.

3. The system claimed in claim 2, wherein the preparing means prepares the message in an optimal fashion.

4. The system claimed in claim 3, wherein the preparing means transmits the message in an optimal fashion.

5. The system claimed in claim 1, wherein the plurality of devices that the obtaining means obtain information from is selected from the group consisting of: computers, facsimile devices, telephones, voice response units, video displays, scanners, video message devices, servers and E-mail.

6. The system claimed in claim 1, wherein the responding means sends a message to recipients in accordance with the user defined rules.

7. The system claimed in claim 6, further including:
   means coupled to the responding means for changing the user-defined rules.

8. The system claimed in claim 1, wherein if a key word appears in a particular ordered information, send that information automatically to one or more particularly specified individuals.

9. The system claimed in claim 1, wherein if ordered information is about a particular subject, send that information automatically to one or more particularly specified individuals.

10. The system claimed in claim 1, wherein if the ordered information is received from a particular individual, automatically forward that information to one or more particularly specified individuals.

11. A method for enabling incoming information received from a plurality of messaging devices to be available on a single unit so that the information may be accessed by a user at one location using the single unit, the method comprising the steps of:
   obtaining information from the plurality of devices;
   identifying the obtained information by message media type;
   storing the obtained information;
   ordering the obtained information from the plurality of devices from most important to least important by utilizing user defined importance criteria stored in the single unit and/or a sender enabled priority indicator embedded in the information;
   indicating the message media type of the ordered information;
   responding to the obtained information in an optimal fashion;
   routing the ordered information automatically in accordance with user selected routing rules; and
   determining the status of responded to information and obtained information.

12. The method of claim 11, further including the step of:
   canceling portions of the stored information at times specified by the user.

13. The method claimed in claim 11, further including the steps of:
   preparing a message in an optimal fashion.

14. The method claimed in 11, further including the steps of:
   scheduling the responded to information at user selected dates and times.

15. The method claimed in claim 11 further including the steps of:
   creating information that may be sent to one or more recipients using more than one messaging device.

16. The method claimed in claim 11 further including the steps of:
   distributing information based upon the subject of the information.

17. The method claimed in claim 11, further including the steps of:
   distributing information based upon user defined criteria.

18. The method claimed in claim 17, wherein the user defined criteria is selected from the groups consisting of: a message originator, distribution list of the message, message content, and priority of the message.

19. The method claimed in claim 11, wherein if a key word appears in a particular ordered information, send that information automatically to one or more particularly specified individuals.

20. The method claimed in claim 11, wherein if ordered information is about a particular subject, send that information automatically to one or more particularly specified individuals.

21. The method claimed in claim 11, wherein if the ordered information is received from a particular individual, automatically forward that information to one or more particularly specified individuals.

* * * * *